United States Patent
Tsai

(10) Patent No.: US 8,157,275 B2
(45) Date of Patent: *Apr. 17, 2012

(54) COLLAPSIBLE SKATEBOARD

(75) Inventor: Shui-Te Tsai, Chang Hwa (TW)

(73) Assignee: Razor USA, LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,490

(22) Filed: Jun. 30, 2009

(65) Prior Publication Data

US 2009/0322049 A1 Dec. 31, 2009

Related U.S. Application Data

(63) Continuation of application No. 11/471,059, filed on Jun. 19, 2006, now Pat. No. 7,559,561, which is a continuation of application No. 10/217,123, filed on Aug. 13, 2002, now Pat. No. 7,063,341, which is a continuation of application No. 09/816,311, filed on Mar. 26, 2001, now Pat. No. 6,431,567, which is a continuation of application No. 09/222,840, filed on Dec. 30, 1998, now Pat. No. 6,206,387.

(51) Int. Cl.
*B62M 1/00* (2010.01)
(52) U.S. Cl. ................. 280/87.05; 280/87.041
(58) Field of Classification Search ............... 280/14.27, 280/14.28, 87.05, 287, 606, 87.01–87.041, 280/655.1; 403/92
See application file for complete search history.

(56) References Cited

U.S. PATENT DOCUMENTS

| | | | |
|---|---|---|---|
| 1,297,282 A | | 3/1919 | White |
| 1,391,312 A | | 9/1921 | Gebhardt |
| 1,570,189 A | | 1/1926 | Sturm |
| 1,658,068 A | * | 2/1928 | White ..................... 280/87.041 |
| 1,687,953 A | * | 10/1928 | Starks ............... 403/58 |
| 1,687,983 A | | 10/1928 | Starks |
| 1,968,975 A | | 8/1934 | Upsacker et al. |
| 2,546,711 A | | 3/1951 | Amendt |
| 3,396,928 A | * | 8/1968 | Lay ............................ 248/188.6 |
| 4,144,822 A | * | 3/1979 | Roberts et al. ............... 108/129 |
| 4,584,735 A | | 4/1986 | Garber |
| 4,707,884 A | | 11/1987 | Chang |
| 4,735,392 A | * | 4/1988 | Farmer .......................... 248/439 |
| 4,905,946 A | | 3/1990 | Wang |
| 5,102,079 A | | 4/1992 | Lee |
| 5,183,129 A | | 2/1993 | Powell |
| 5,238,082 A | * | 8/1993 | Stegeman et al. ............. 180/208 |
| 5,437,425 A | | 8/1995 | Hou |
| 5,630,633 A | * | 5/1997 | Dupre et al. .................. 294/53.5 |
| 5,692,761 A | * | 12/1997 | Havlovitz ................ 280/33.994 |
| 5,816,614 A | * | 10/1998 | Kramer et al. ................. 280/775 |

(Continued)

*Primary Examiner* — Katy M Ebner
(74) *Attorney, Agent, or Firm* — Knobbe Martens Olson & Bear, LLP

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

14 Claims, 6 Drawing Sheets

U.S. PATENT DOCUMENTS

| | | | | |
|---|---|---|---|---|
| 5,848,660 A | * | 12/1998 | McGreen | 180/206 |
| 5,927,733 A | | 7/1999 | Banda | |
| 5,938,223 A | | 8/1999 | Kotlier | |
| 5,992,566 A | | 11/1999 | Yeh | |
| 6,120,044 A | | 9/2000 | Tsai | |
| 6,182,988 B1 | | 2/2001 | Wu | |
| 6,206,387 B1 | | 3/2001 | Tsai | |
| 6,431,567 B2 | | 8/2002 | Tsai | |

* cited by examiner

US 8,157,275 B2

COLLAPSIBLE SKATEBOARD

RELATED APPLICATIONS

This application is a continuation of U.S. patent application Ser. No. 11/471,059, filed Jun. 19, 2006, pending, which is a continuation of U.S. patent application Ser. No. 10/217,123, filed Aug. 13, 2002, now U.S. Pat. No. 7,063,341, which is a continuation of U.S. patent application Ser. No. 09/816,311, filed Mar. 26, 2001, now U.S. Pat. No. 6,431,567, which is a continuation of U.S. patent application Ser. No. 09/222,840, filed Dec. 30, 1998, now U.S. Pat. No. 6,206,387, the entireties of which are incorporated by reference herein and made a part of the present disclosure.

BACKGROUND OF THE INVENTION

1. Field of the Invention

This invention is related to an improvement in the structure of a collapsible skateboard.

2. Description of the Related Art

The conventional skateboard with an upright handle is fixed in structure so that it is difficult to carry. Hence, a collapsible skateboard has been developed to obviate this drawback. However, such a collapsible skateboard is complicated in structure and expensive in cost. Furthermore, the handle of the collapsible skateboard cannot be kept at a fixed position, thereby making it inconvenient to use.

SUMMARY OF THE INVENTION

Therefore, it is an object of the present invention to provide an improved collapsible skateboard which can obviate and mitigate the above-mentioned drawbacks.

This invention is related to an improvement in the structure of a collapsible skateboard.

It is the primary object of the present invention to provide a collapsible skateboard that includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

DETAILED DESCRIPTION OF THE PREFERRED EMBODIMENTS

Figure 1:
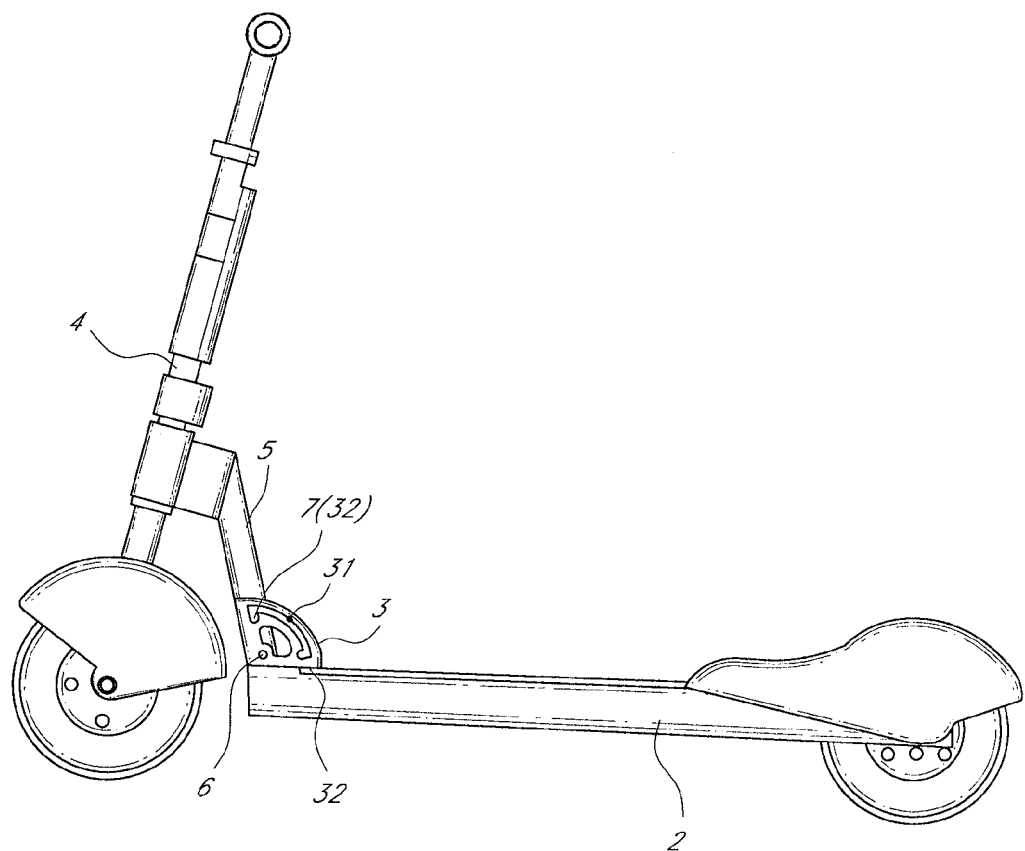
FIG. 1 is a side view of the present invention.
Figure 2:
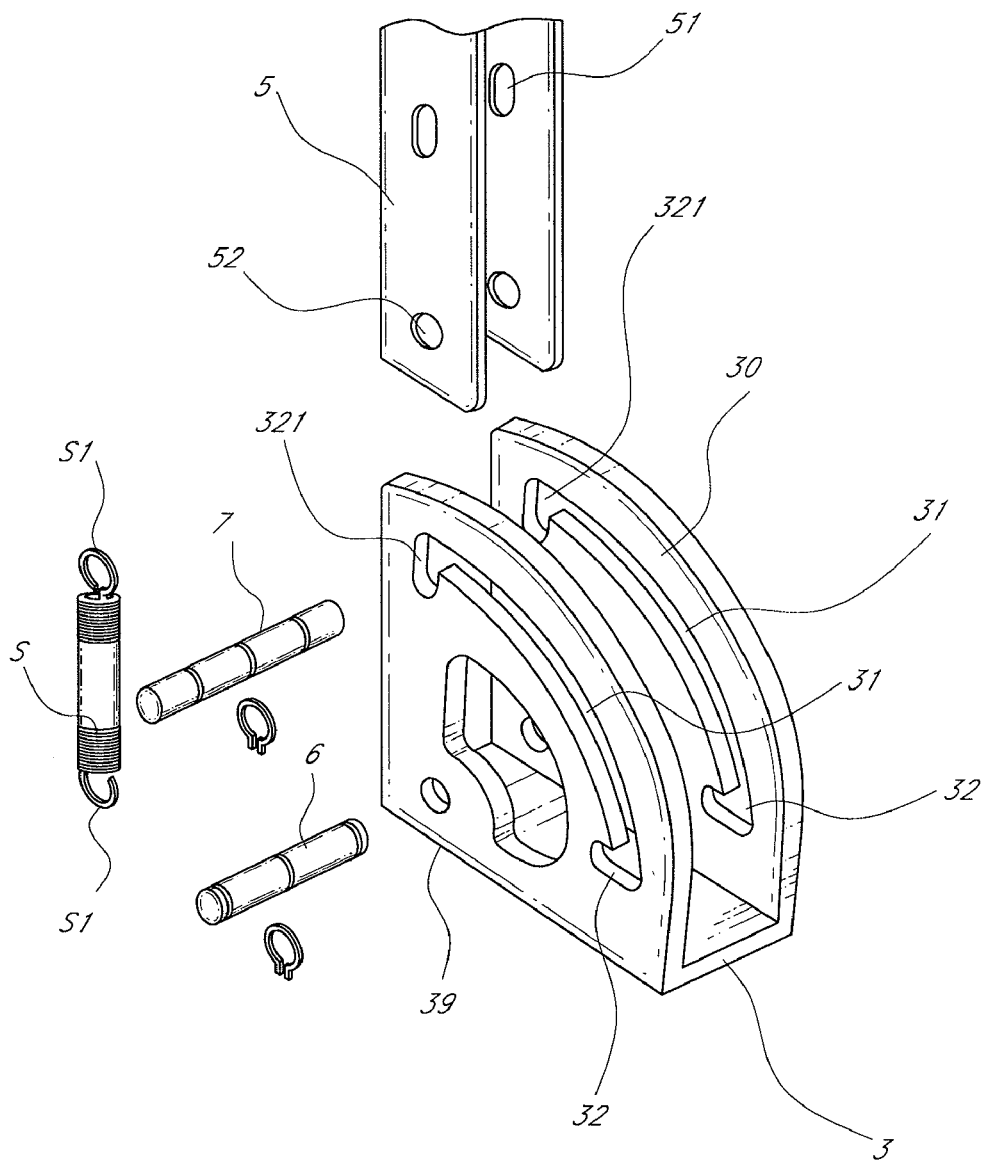
FIG. 2 is an exploded view of the present invention.
Figure 3:
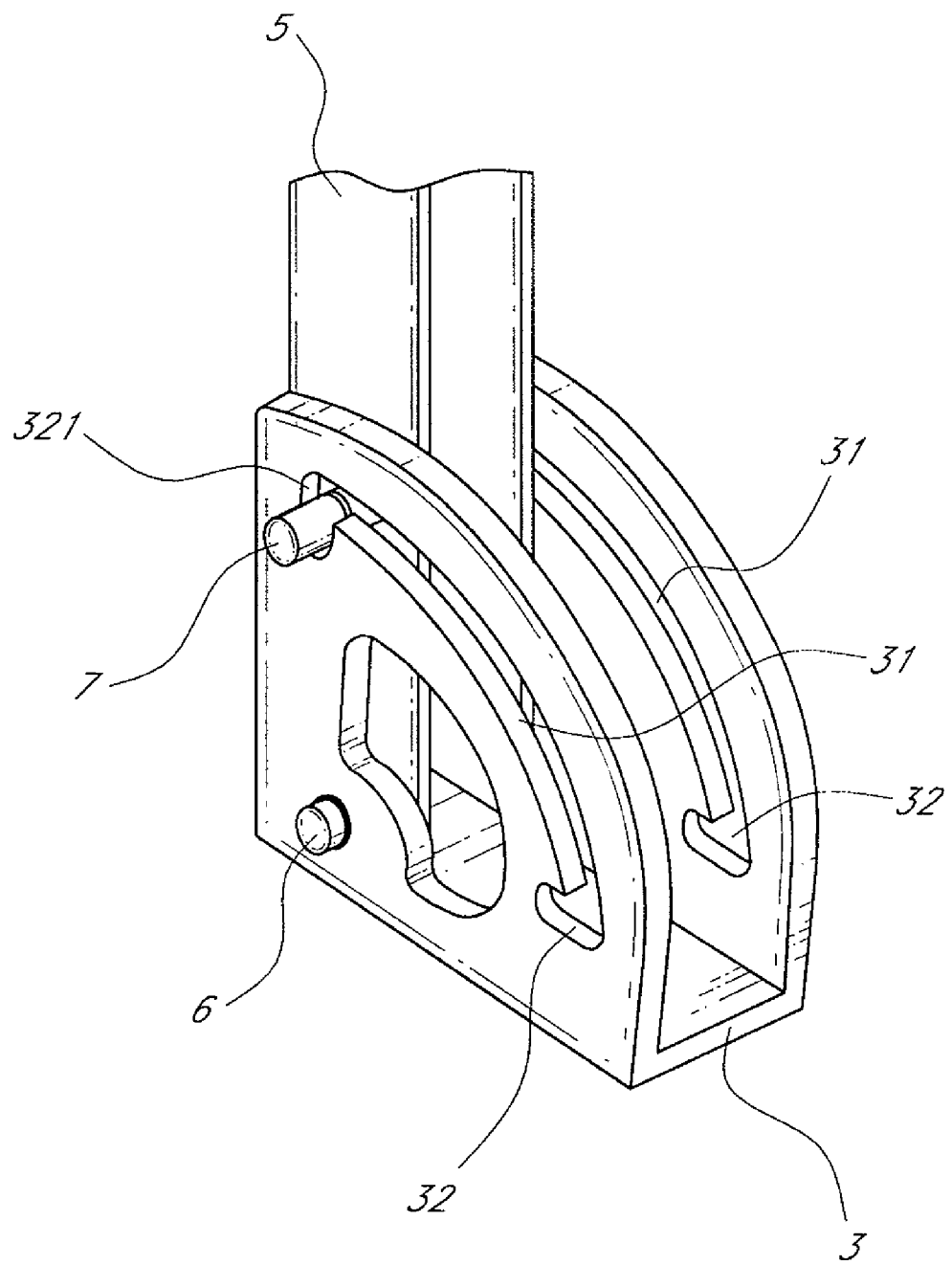
FIG. 3 is a perspective view of the present invention.
Figure 4:
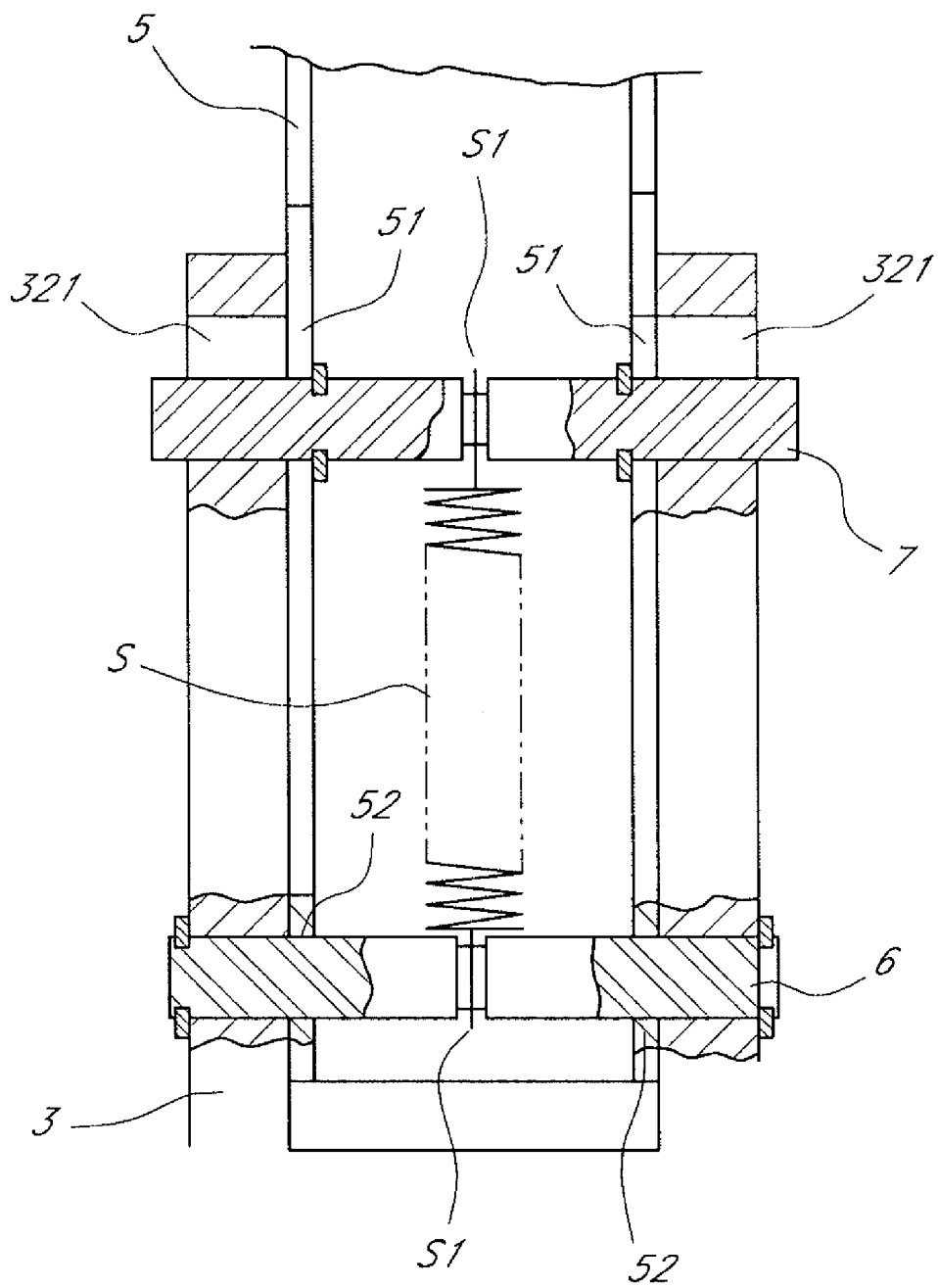
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical recess 321 at the upper end. Each lug 30 is further formed with a circular hole 39 below the vertical recess 321. An adjust sin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end S1 connected to the intermediate portion of the adjust pin 7 and a lower end connected to the intermediate portion of the pivot pin 6 so that the adjust pin 7 will be retained within the vertical recess 5321 thereby keeping the handle 4 at an upright position.

Figure 5:
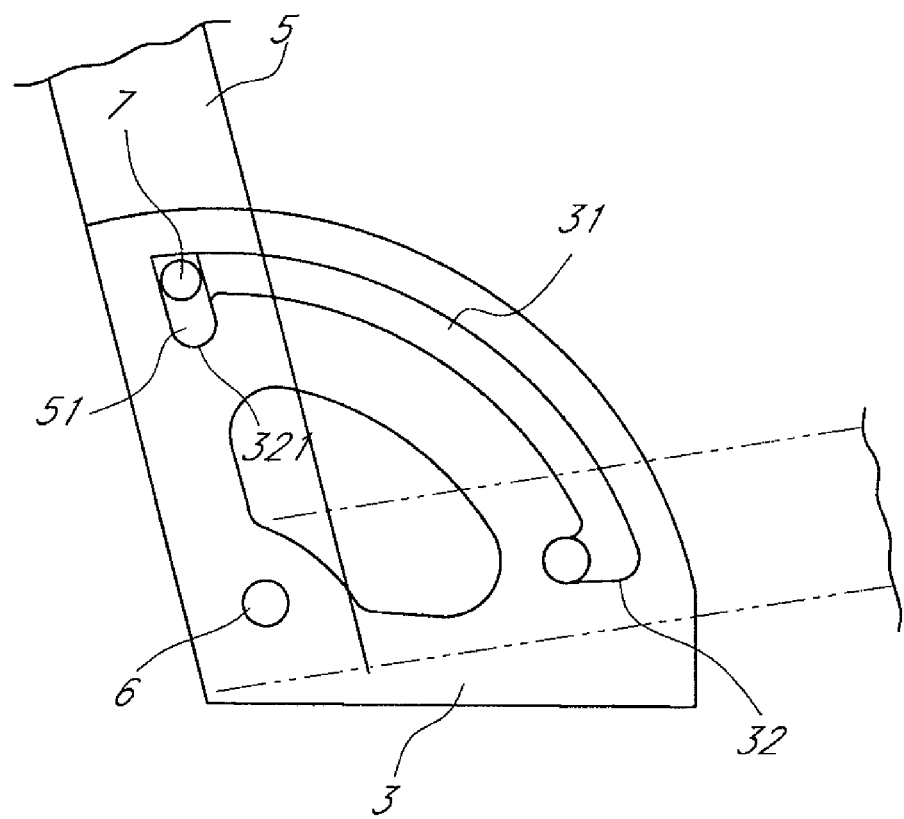
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When in use, simply move the handle 4 along the direction away from the platform 2 so that the adjust pin 7 is moved along the curved slots 31 to engage with the vertical recesses 321.

Figure 6A:
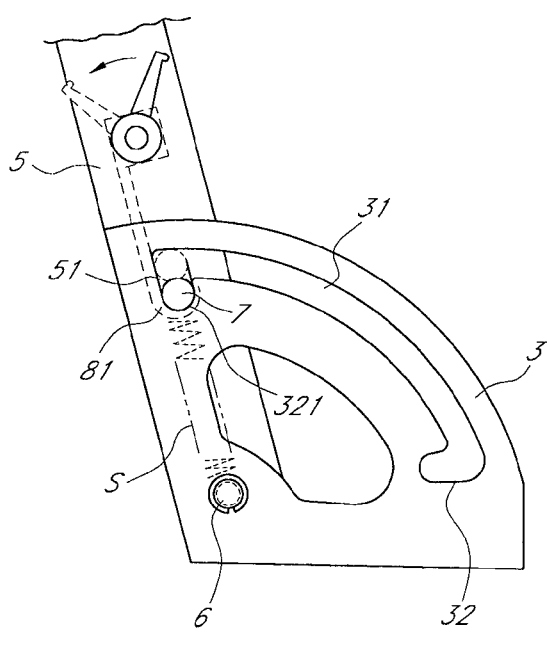
FIGS. 6A and 6B illustrate another preferred embodiment of the present invention.
Figure 6B:
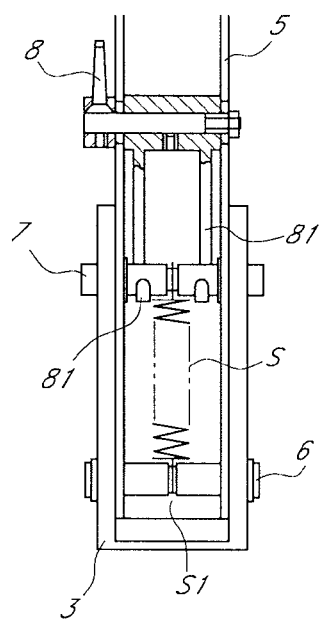

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out 5 of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

What is claimed is:
1. A collapsible scooter, comprising:
a first portion comprising a bracket supporting a handle and a front wheel for rotation relative to said bracket about a steering axis, said bracket including an opening;
a second portion supporting a rear wheel, wherein said first portion and said second portion are rotatably coupled by a pivot pin, said pivot pin restricting relative movement between said first and second portions to rotational movement about a fixed pivot axis and between a collapsed position and an operable position;

an adjust pin supported by said first portion, said adjust pin extending through said opening in a direction substantially parallel to said pivot axis;

a hook that extends at least partially around a circumference of said adjust pin in said collapsed position of said scooter; and a lever coupled to said hook, wherein said lever is configured to move said hook to permit said collapsible scooter to move from said collapsed position to said operable position;

wherein said collapsible scooter further comprises a spring having a first end coupled to said adjust pin, said spring configured to normally bias said adjust pin in a direction tending to engage said pin with a recess.

2. The collapsible scooter of claim 1, wherein said second portion includes a slot, said adjust pin extending into said slot in a direction substantially parallel to said pivot axis.

3. The collapsible scooter of claim 1, wherein said bracket includes a second opening, said adjust pin extending through said second opening in a direction substantially parallel to said pivot axis.

4. The collapsible scooter of claim 1, wherein said adjust pin includes at least one cylindrical portion, and said longitudinal axis of said cylindrical portion is substantially parallel to said pivot axis.

5. The collapsible scooter of claim 4, wherein said cylindrical portion is positionable into engagement with said first and second recesses.

6. The collapsible scooter of claim 1, wherein rotational motion of said lever moves said hook radially from said pivot axis.

7. The collapsible scooter of claim 1, wherein said adjust pin defines a groove configured to accommodate said first end of said spring.

8. The collapsible scooter of claim 1, wherein said spring includes a second end that is coupled to said pivot pin.

9. The collapsible scooter of claim 8, wherein an outer surface of said pivot pin defines a groove configured to accommodate said second end of said spring.

10. The collapsible scooter of claim 2, wherein said second portion includes a second slot, said adjust pin extending into said second slot in a direction substantially parallel to said pivot axis.

11. The collapsible scooter of claim 2, wherein the slot is elongate and includes a first recess and a second recess, said adjust pin being positionable into engagement with said first recess to secure said collapsible scooter in said collapsed position, and said adjust pin being positionable into engagement with said second recess to secure said collapsible scooter in said operable position.

12. The collapsible scooter of claim 11, wherein said adjust pin moves in a radial direction relative to said pivot axis into engagement with said first and second recesses.

13. The collapsible scooter of claim 11, wherein said slot includes a first end and a second end, said first recess adjacent to the first end and said second recess adjacent to the second end.

14. The collapsible scooter of claim 11, wherein said first and second recesses extend from the slot towards the pivot axis.

\* \* \* \* \*